(12) United States Patent
Ryynänen et al.

(10) Patent No.: US 9,346,232 B2
(45) Date of Patent: May 24, 2016

(54) AUTOMATIC TRANSPORT APPARATUS FOR PACKAGE MANUFACTURING

(71) Applicant: Tresu A/S, Bjert (DK)

(72) Inventors: Marko Ryynänen, Pulp (FI); Petri Sirviö, Imatra (FI)

(73) Assignee: Tresu A/S, Bjert (DK)

( * ) Notice: Subject to any disclaimer, the term of this patent is extended or adjusted under 35 U.S.C. 154(b) by 0 days.

(21) Appl. No.: 14/396,959

(22) PCT Filed: Apr. 23, 2013

(86) PCT No.: PCT/EP2013/058367
§ 371 (c)(1),
(2) Date: Oct. 24, 2014

(87) PCT Pub. No.: WO2013/160287
PCT Pub. Date: Oct. 31, 2013

(65) Prior Publication Data
US 2015/0110583 A1 Apr. 23, 2015

(30) Foreign Application Priority Data
Apr. 24, 2012 (FI) .................................... 20125449

(51) Int. Cl.
*B31B 1/20* (2006.01)
*B31B 1/00* (2006.01)
*B65G 47/26* (2006.01)
(Continued)

(52) U.S. Cl.
CPC ............... *B31B 1/20* (2013.01); *B26D 7/0625* (2013.01); *B26D 7/0675* (2013.01); *B26F 1/38* (2013.01); *B31B 1/00* (2013.01); *B31B 1/04* (2013.01); *B65G 43/00* (2013.01); *B65G 47/268* (2013.01); *B65G 47/28* (2013.01); *B65H 31/3054* (2013.01); *B31B 2201/0264* (2013.01); *B31B 2201/147* (2013.01); *B31B 2201/62* (2013.01); *B31B 2201/88* (2013.01); *B31B 2201/95* (2013.01); *B65G 47/5113* (2013.01); *B65H 2301/4213* (2013.01); *B65H 2301/42264* (2013.01); *B65H 2301/4353* (2013.01); *B65H 2701/176* (2013.01); *B65H 2701/1944* (2013.01)

(58) Field of Classification Search
CPC ................ B31B 1/74; B31B 1/88; B31B 1/20
See application file for complete search history.

(56) References Cited

U.S. PATENT DOCUMENTS 3,933,237 A * 1/1976 Rotterman ........... B65G 47/261
198/418
6,484,475 B1 * 11/2002 Neagle .................... B65B 59/04
53/167

(Continued)

FOREIGN PATENT DOCUMENTS

WO 2009/130393 A1 10/2009

*Primary Examiner* — Thomas Randazzo
(74) *Attorney, Agent, or Firm* — Roberts Mlotkowski Safran & Cole, P.C.; David S. Safran

(57) ABSTRACT

An apparatus comprises a stacker configured to stack planar workpieces into stacks, and a cutter configured to cut preforms out of planar workpieces. The cutter is located downstream of said stacker on a manufacturing line, and a conveyor exists between said stacker and cutter. The apparatus comprises a conveyor controller, which is configured to, after transferring a stack from said conveyor to a feeder section of said cutter; rewind the conveyor to place a foremost free location after existing stacks on the conveyor to a position where it is ready to receive a stack from said stacker.

9 Claims, 5 Drawing Sheets

(51) Int. Cl.
  *B31B 1/04* (2006.01)
  *B65G 43/00* (2006.01)
  *B65G 47/28* (2006.01)
  *B65H 31/30* (2006.01)
  *B26D 7/06* (2006.01)
  *B26F 1/38* (2006.01)
  *B65G 47/51* (2006.01)

(56) References Cited

U.S. PATENT DOCUMENTS 6,793,217 B2    9/2004  Grønbjerg
8,493,421 B2 *  7/2013  Pettersson ..................... 347/110
2012/0329627 A1 * 12/2012 Pettersson ................. B31B 1/72
                                                    493/128

* cited by examiner

AUTOMATIC TRANSPORT APPARATUS FOR PACKAGE MANUFACTURING

BACKGROUND OF THE INVENTION

1. Field of the Invention

The invention concerns generally the technical field of transporting sheet-like workpieces on a manufacturing line. Especially, the invention concerns the transporting of a series of printed workpieces between a stacker and a cutter in a manufacturing process where the series may be short and irregular.

2. Description of Related Art

A package manufacturing line typically comprises a printer, a coater, a stacker, and a cutter in this order. Planar, sheet-like workpieces are fed into the printer. Printed workpieces receive a coating in a coater, after which they are stacked in a stacker to wait for cutting. The cutter is typically a die cutter, in which the cutting tool needs to be changed between series of workpieces that are to be cut differently. Therefore it is advantageous that the stacker makes separate stacks of the different series. Each stack is transported to the cutter and placed in an automatic feeder section when the appropriate tool is in place and cutting can begin.

The International Patent Application Publication WO 2009/130393 A1 and corresponding U.S. Pat. No. 8,493,421 disclose a modular, automatic conveyor, which may comprise branching and combining points, and which may even combine the flows coming from parallel printing and coating units to a common cutter. Practice has shown that despite its many advantages, the conveyor disclosed in these documents does not offer optimal possibilities for arranging the handling of different series, especially when there is large fluctuations in the sizes of consecutive series.

SUMMARY OF THE INVENTION

An object of the present invention is to enhance the automatic operation of a manufacturing line where a cutter follows a stacker. Another object of the present invention is to optimize the use of space within such a manufacturing line despite variation in the sizes of series to be manufactured. Yet another object of the present invention is to decrease the need for manual intervention in transporting planar workpieces from a stacker to a cutter.

These and further advantages can be achieved by allowing the conveyor between a stacker and a cutter to rewind to a position where it receives the next stack of workpieces onto the foremost free location on the conveyor.

The exemplary embodiments of the invention presented in this patent application are not to be interpreted to pose limitations to its applicability. The verb "to comprise" is used in this patent application as an open limitation that does not exclude the existence of other features.

The invention itself, both as to its construction and its method of operation, together with additional objects and advantages thereof, will be best understood from the following description of specific embodiments when considered in connection with the accompanying drawings.

DETAILED DESCRIPTION OF THE INVENTION

Figure 1:
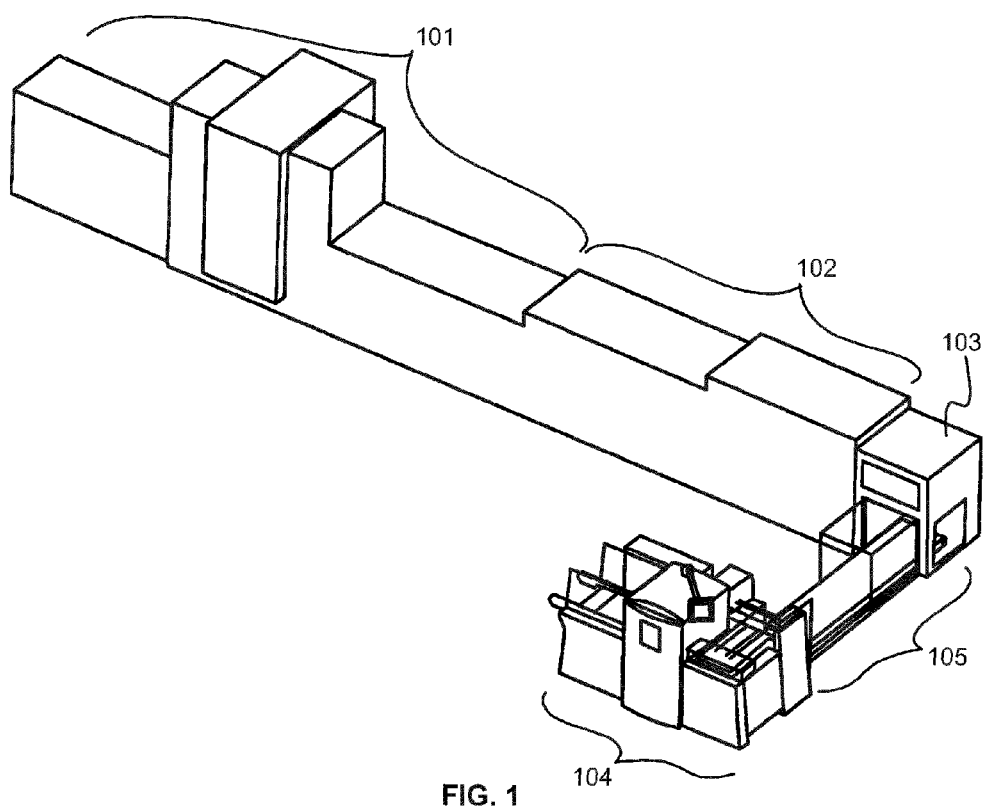
FIG. 1 illustrates a manufacturing line.

FIG. 1 is an axonometric projection of a manufacturing line for manufacturing packages for a digitally controlled process. The manufacturing line comprises a digital printer 101, a coater 102, a stacker 103, a cutter 104, and a conveyor 105. The coater 102 is arranged to apply a protecting and finishing coat of varnish on the surfaces of the printed workpieces. The stacker 103 is arranged to collect the surface-treated printed workpieces in stacks. The completed stacks move along the conveyor 105 to the cutter 104. Further processing stages, which are not shown in FIG. 1, but which would easily be located in the apparatus after the cutter 104, and include units for waste removal, application of glue, and folding.

The capacity (workpieces handled per unit of time) of a cutter, especially a die-cutter, can be considerably higher than that of digital printing machines known at the moment of writing this text. The difference in capacity can be exploited, so that any stage of the process between the printing and die-cutting can be used as a buffer. Buffering is synonymous to temporarily storing the printed workpieces, e.g., for the time of changing the die-cutting tool, so that they still remain within the digitally controlled process for the time of the temporary storage. The buffer is arranged to feed the temporarily stored, printed workpieces forward, when the die-cutting stage is operating again.

Centralized digital control makes fully automatic buffering possible: switching off the die-cutting machine produces a piece of control information, on the basis of which the digital control system transmits to the buffer stage instructions to start buffering. Correspondingly, restarting the die-cutting machine produces another piece of control information, on the basis of which the digital control system transmits to the buffer stage instructions to start feeding forward the temporarily stored printed workpieces.

In the apparatus according to FIG. 1, the buffer is comprised of the stacker 103 and the conveyor 105. The stacker 103 is configured to stack the planar workpieces, which come from printing and coating, in stacks that move forward on the conveyor 105, one stack at a time. The maximum number of printed workpieces that can be buffered is obtained by dividing the length of the conveyor line 105 by the length of the stack (whereby the maximum number of stacks accommodated on the conveyor 105 one after the other is obtained) and by multiplying this provisional result by the greatest possible number of workpieces that a single stack can contain.

Figure 2:
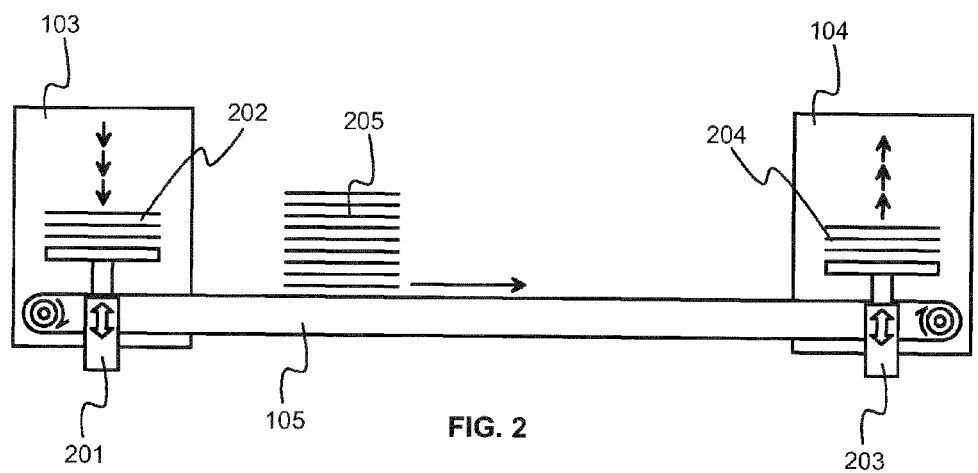
FIG. 2 illustrates a part of the manufacturing line of FIG. 1.

FIG. 2 schematically illustrates the stacker 103, the cutter 104, and the conveyor 105 between them. A hoist 201 at the stacker 103 lowers the accumulating stack 202 of workpieces, and eventually places it on the conveyor 105. Another hoist 203 at the cutter 104 takes a stack 204 of workpieces and lifts it up, thus acting as a part of the feeder section of the cutter. A stack 205 of workpieces is shown in the middle, where the movement of the conveyor 105 transports it from the stacker 103 to the cutter 104.

It should be noted that FIG. 2 is only a schematic illustration, especially concerning the hoists at the stacker and the cutter. According to one alternative, the output of the stacker 103 may comprise a combined conveyor/elevator module that implements both the vertical movement (which is required to always receive the latest printed workpiece correctly and fluently on top of the currently accumulating stack, and to eventually deliver the completed stack on the appropriate level to onto the conveyor) and the horizontal movement (which is required to successfully transfer the completed stack onto the conveyor proper). The feeder section of the cutter may comprise a feeder apparatus that, as such, is separate from the actual cutter machine and that is similarly configured to implement both vertical and horizontal movements according to need.

Figure 3:
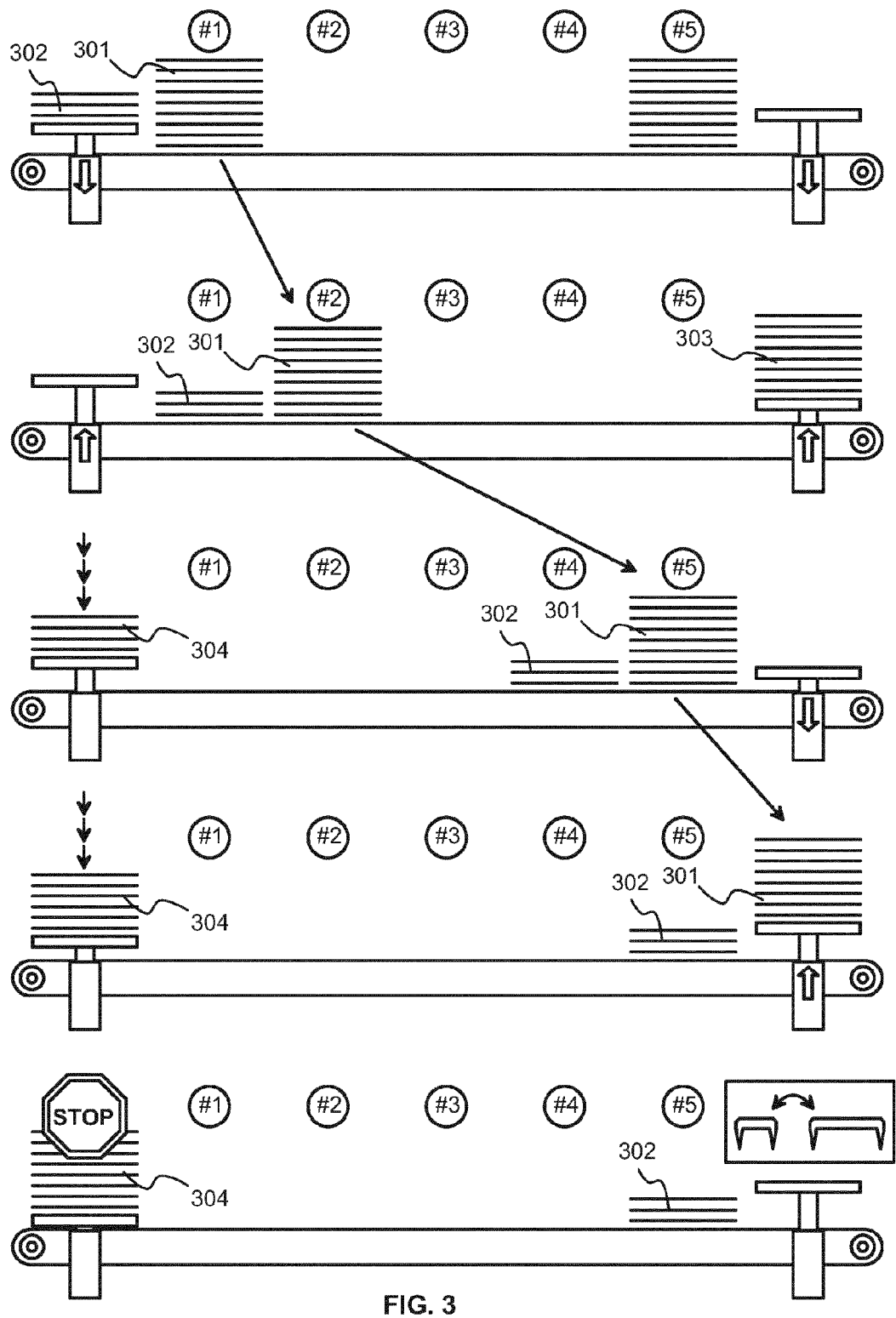
FIG. 3 illustrates exemplary phases of operation of a conveyor.

FIG. 3 illustrates a problem that may occur with a conveyor like that in FIGS. 1 and 2. In FIG. 3, it is assumed that the length of the conveyor is seven times the length of a typical stack. Thus, in addition to the location immediately within the stacker (which we may call the 0:th location) and the location already within the cutter (the N:th location), there are five locations along the conveyor where a stack may be temporarily stored, i.e., buffered.

In the topmost phase of FIG. 3, there are stacks at locations #1 and #5. The proceeding of stack 301 is followed as an example; in the topmost phase it is at location #1. Both hoists are coming down; the one at the stacker to deliver one more completed stack 302 onto the conveyor and the one at the cutter to receive the next stack and to take it to cutting. Here, it is assumed that the completed stack 302 from the stacker makes it onto the conveyor before the conveyor starts moving, so the next movement of the conveyor takes all three stacks forward by one location. Consequently, in the second phase of FIG. 3, stack 301 is at location #2, and the hoists are going up.

Since cutting is typically faster than printing, we assume that the rightmost stack 303 of the second phase is cut relatively quickly, compared to the rate at which new printed workpieces begin to accumulate at the stacker. We may also assume that the next series to be printed is relatively long. Thus, the third phase of FIG. 3 shows the hoist at the cutter coming down again, ready to take the next stack 301 to cutting, while the newest stack 304 still keeps accumulating at the stacker. The conveyor has been driven forward by three locations in order to bring the next stack 301 ready for feeding into the cutter.

The fourth phase in FIG. 3 shows how the conveyor has moved forward by one more location. Now stack 301 is going up to the cutter, while stack 304 is almost ready at the stacker. However, stack 301 was the last one to be cut with the current die, so a change of dies must be made before operation can continue. The lowest phase in FIG. 3 shows how the conveyor cannot move forward while the cutter (and, as a part of it, its hoist) is inoperative because of the die change. This means that the whole manufacturing line must be stopped. Even if the buffer is nearly empty (no stacks exist at locations #1, #2, #3, and #4), no more workpieces can be printed, coated, and stacked before the cutter is operative again.

It might be suggested to decouple the hoist from the remaining operations of the cutter, so that the hoist could come down to fetch stack 302 despite the die change. This would allow the conveyor to move which, in turn, would remove the cause for stopping the manufacturing line. However, the case could be such where another stack would exist at location #4 in the lowest phase of FIG. 3, which would only allow the conveyor to move forward by one location. The same deadlock would soon recur, especially if the newest series following stack 304 would be relatively short.

Figure 4:
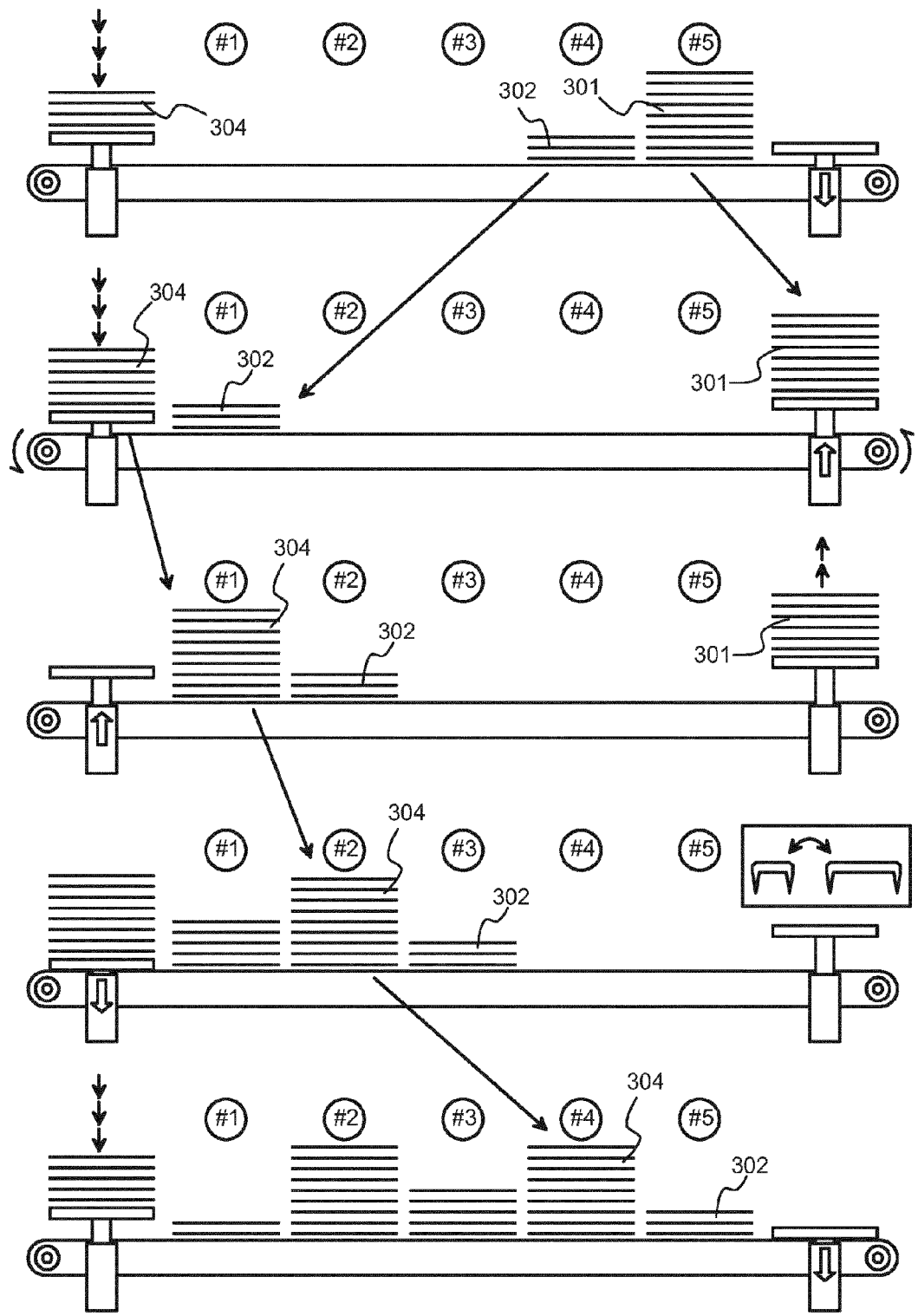
FIG. 4 illustrates other exemplary phases of operation of a conveyor.

FIG. 4 illustrates how rewinding the conveyor can be used to solve the problem. The topmost phase in FIG. 4 is the same as the third phase in FIG. 3. The second phase in FIG. 4 shows how, after stack 301 has been transferred from the conveyor to the feeder section of the cutter, the conveyor is rewound to place a foremost free location after existing stacks on the conveyor (i.e., the location immediately following stack 302) to a position where it is ready to receive a stack from the stacker (i.e., directly below the hoist of the stacker).

In the third phase of FIG. 4, stack 301 is still being cut while the (now completed) stack 304 has been received on the conveyor, and the hoist of the stacker is going up again for beginning the accumulation of yet another stack. Now, even if the die change at the cutter took longer than expected, the whole buffering space offered by the conveyor can be utilized for receiving a number of consecutive stacks.

The fact that stack 302 is not waiting at location #5, ready to be immediately transferred to the feeder section of the cutter once the cutter is operative again, does not cause any additional complications. If such a situation occurs while stack 302 is still at one of locations #1, #2, #3, or #4, the conveyor can be moved fast forward to deliver stack 302 to the cutter, and then rewound again so that the foremost free location after existing stacks on the conveyor is always at ready to receive the next stack to be completed by the stacker.

Figure 5:
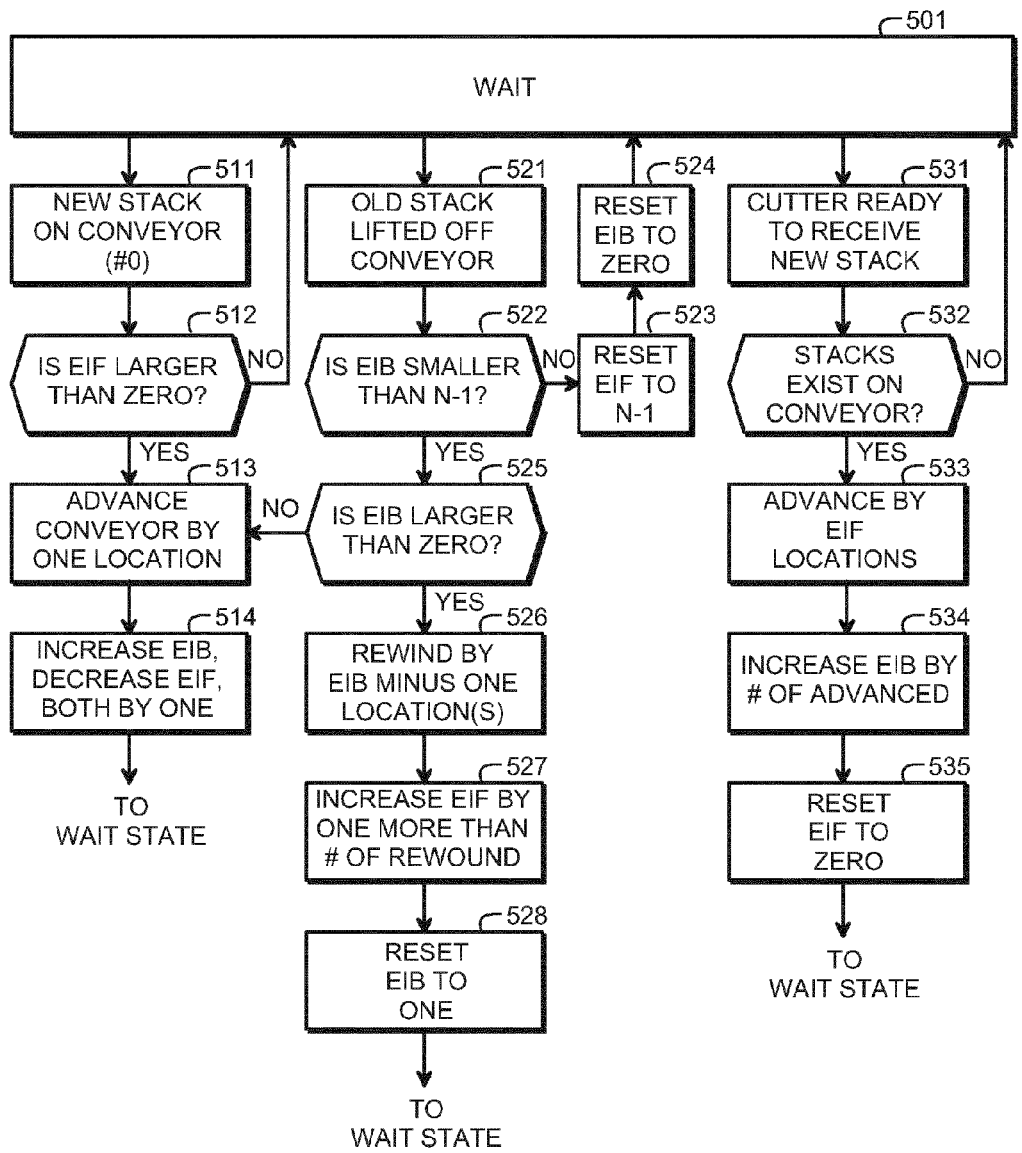
FIG. 5 illustrates a method for operating a conveyor.

FIG. 5 illustrates a method for operating an intelligent automatic transport apparatus for package manufacturing. The method of FIG. 5 does not require placing sensors along the conveyor, but is based on maintaining a first variable value EIF and a second variable value EIB. The acronyms come from Empties In Front and Empties In Back respectively, and—as the names say—the variable values indicate a number of free locations on the conveyor ahead of (EIF) and behind (EIB) existing stacks on the conveyor.

At the top of FIG. 5 is a wait state 501. After receiving a new stack on the conveyor at step 511, the current value of EIF is checked to find out, whether there is any empty space in the front that would allow advancing the conveyor. A negative finding at step 512 means that the whole buffer is full, so a return to the wait state 501 occurs.

If the EIF value is larger than zero, the conveyor is advanced by one location at step 513. This causes the free space in front to decrease and that at the back to increase by one location, so after advancing the conveyor by one location, the EIB value is decreased and the EIB value is increased, both by one, at step 514 before returning to the wait state 501.

After transferring a stack to the feeder section of the cutter (in FIGS. 2-4: lifting a stack off the conveyor with the hoist at the cutter) at step 521, it must first be checked whether any remaining stacks exist on the conveyor. This can be done, for example, by checking at step 522, whether the EIB value is still smaller than N−1 (where N is the total number of stacks to fit the conveyor). An EIB value equal to N−1 means that after the latest stack was lifted off the N:th location, only free space remains on the conveyor. In FIG. 5, this causes resetting of the variable values to EIF=N−1 and EIB=0 at steps 523 and 524 before returning to the wait state.

If stacks were found at step 522, next, it is checked whether the last stack is still waiting to be moved out of the stacker in location #0 (for example, if it was found earlier at step 512 that the buffer was full, and the newly completed stack could not be moved forward). An EIB value zero found at step 525 causes the conveyor to be advanced by one location at step 513, in order to make room for a subsequent stack.

An EIB value larger than zero but smaller than N−1, means that there may be a chance to rewind the conveyor. Step 526 comprises rewinding the conveyor by a number of locations that is one less than the current EIB value. Thus, if the EIB was one, no rewinding actually occurs. After rewinding, the EIF value is increased at step 527 by one more than the number of locations rewound, because the total increase in the empty space in front comes from rewinding at step 526 plus lifting one stack off the conveyor at step 521. Step 528 comprises setting the EIB value to one, because the conveyor was rewound so that only the 0:th location remains free. A return to the wait state occurs after step 528.

The rightmost column of steps in FIG. 5 corresponds to the situation where the hoist at the cutter comes down to receive a new stack. As a response to the cutter being ready to receive a new stack at step 531, a check is made at step 532 whether stacks exist on the conveyor. For example, the values EIF=N−1 and EIB=0 mean a negative finding, causing a return to the wait state. If stacks exist, the conveyor is advanced at step 533 by as many locations as the current EIF value. This brings the foremost stack to the feeder section of the cutter. The EIB value is increased at step 534 by the number of locations advanced, and the EIF value is reset to zero at step 535 before returning to the wait state, after which an immediate continuation into step 521 is to be expected.

Actual values like "zero" and "one" have been used above for simplicity and ease of understanding. Similarly, for simplicity, we have assumed that all stacks have an equal length in the longitudinal dimension of the conveyor, so that a "location" has sufficient length in the longitudinal dimension of the conveyor to accommodate exactly one stack. In practice, the value of the variables used to indicate a number of free locations (or, more generally, the amount of free space) on the conveyor ahead of and behind existing stacks can be defined differently. In general we may say that "zero" in the description above corresponds to a value indicating insufficient space on the conveyor in the particular direction for a stack of a particular length, "one" corresponds to a value indicating sufficient space on the conveyor in the particular direction for exactly one stack of a particular length, and so on.

Figure 6:
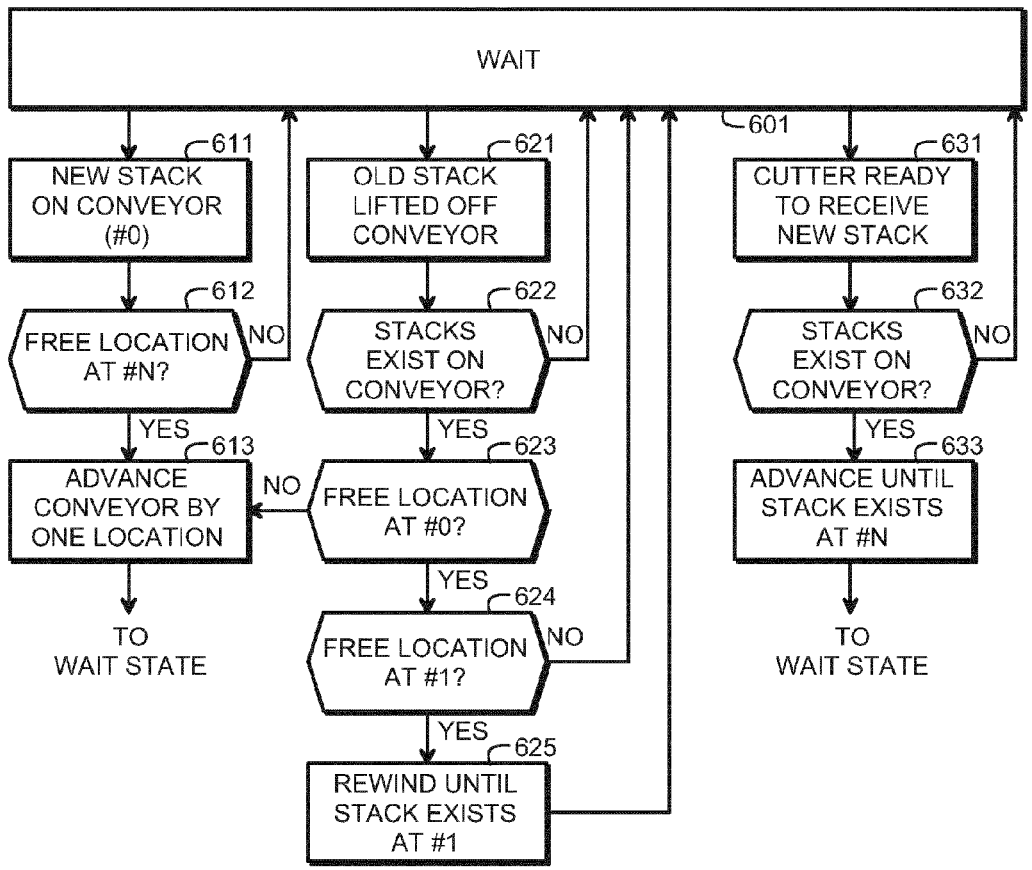
FIG. 6 illustrates another method for operating a conveyor.

FIG. 6 illustrates an alternative method that relies on having sensors along the conveyor, so that the control apparatus can tell at any time, whether a stack exists in a particular location, without having to calculate from it from variable values like EIB and EIF.

A wait state 601 exists also in the method of FIG. 6. After receiving a new stack on the conveyor at step 611, a check is made at step 612 to find out if a free location exists closest to the feeder section. A positive finding at step 613 causes advancing the conveyor by one location at step 613.

After transferring a stack so the feeder section at step 621, a check is made at step 622 if stacks exist on the conveyor. No stacks on the conveyor means that nothing could be gained by moving the conveyor, so only a return to the wait state occurs. If at least one stack exists and it is additionally found at step 623 that one exists at the location closest to (or within) the stacker, the conveyor is advanced by one location at step 613. If the last-mentioned condition did not trigger advancing the conveyor, the previously mentioned rewinding is executed until only the location closest to (or within) the stacker is free. This is accomplished at steps 624 and 625.

As a response to the cutter being ready to receive a new stack (step 631) and stacks existing on the conveyor (check at step 632), the conveyor is advanced at step 633 until a stack appears at the location closest to the feeder section. After returning to the wait state from step 633 an immediate continuation into step 621 is to be expected.

Figure 7:
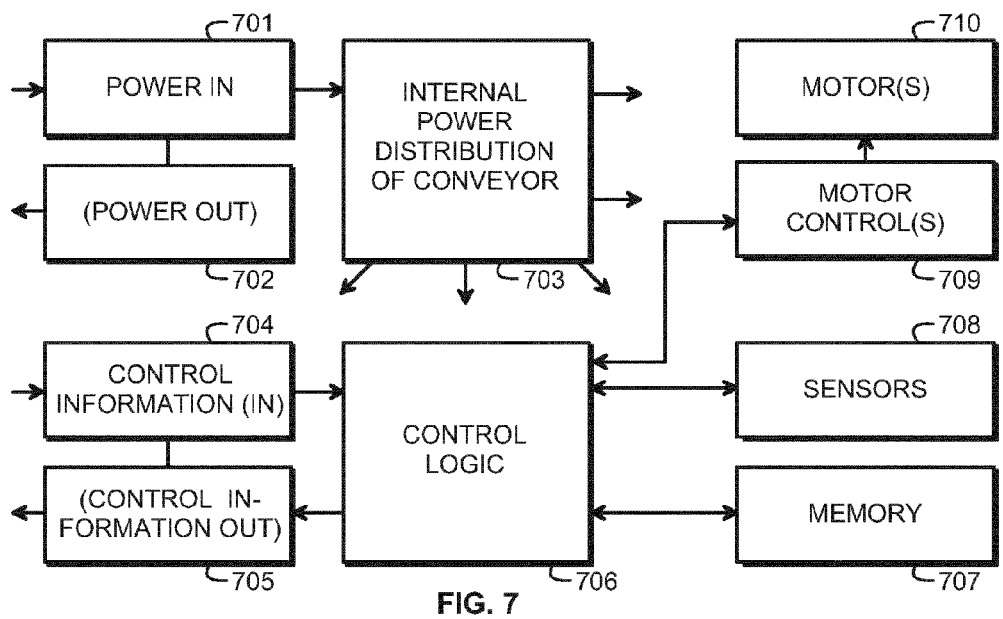
FIG. 7 illustrates a conveyor controller and other exemplary parts of a conveyor.

FIG. 7 shows an example of a conveyor controller and some other exemplary parts of a conveyor. For receiving operating power, block 701 comprises the connectors required. In some cases operating power is linked from one part of the manufacturing line to another, so a direct connection from the operating power input block 701 to an optional operating power output block 702 is shown. A power distribution block 703 is arranged to distribute electric power to the parts of the conveyor that need electricity.

For transmitting control information, the conveyor comprises the interfaces needed for, e.g., connecting to a control information bus. The example of FIG. 7 shows a separate input block 704 and output block 705 of the control information, but it is obvious that the connection to the control information bus can also take place through one two-way connection block only.

The conveyor controller comprises a control logic 706, which can be, for example, a programmable logic circuit or a relatively simple microprocessor. FIG. 7 shows separately the memory 707 that is available to the control logic, the control logic 706 being able to use the program stored in the memory. If needed, the memory 707 can also be used as an intermediate storage for variable values, measurement information and similar information. The sensor block 708 that is connected to the control logic 706 may contain, for example, photocells, limit switches, weight sensors and other sensors, through which the control logic 706 is arranged to receive information about the operation of the conveyor, and other necessary factors. Especially the sensors in block 708 may be configured to convey to the conveyor controller information about stacks existing at various locations on the conveyor. The control logic 706 is arranged to give control commands to a motor control block 709, which controls the motor(s) used to implement the conveyor movements in block 710.

Methods according to embodiments of the invention may be implemented by producing machine-readable instructions that constitute a computer program. The computer program may be embodied on a volatile or a non-volatile computer-readable record medium, for example as a computer program product comprising at least one computer readable non-transitory medium having program code stored thereon, the program code, which when executed by an apparatus, causes the apparatus at least to perform the operations described hereinbefore for the computer program. The computer program may be stored, for example, in the memory 707.

What is claimed is:

1. An apparatus for package manufacturing, comprising:
a stacker configured to stack planar workpieces into stacks,
a cutter configured to cut preforms out of the planar workpieces and located downstream of said stacker on a manufacturing line, and
a conveyor between said stacker and cutter upon which the stacks are directly received from the stacker; wherein the apparatus comprises a conveyor controller, which is configured to, after transferring a stack from said conveyor to a feeder section of said cutter, rewind the conveyor to place a fore-most free location following existing stacks on the conveyor to a position where it is ready to receive a stack from said stacker.

2. An apparatus according to claim 1, comprising sensors configured to convey to the conveyor controller information about stacks existing at various locations on the conveyor.

3. An apparatus according to claim 1, wherein the conveyor extends continuous from the stacker to the cutter.

4. An apparatus according to claim 3, further comprising a hoist at the cutter which raises each stack up off of the conveyor.

5. An apparatus according to claim 3, further comprising a hoist at the stacker which lowers stacks onto the conveyor.

6. An apparatus according to claim 5, further comprising a hoist at the cutter which raises each stack up off of the conveyor.

7. A method for package manufacturing, comprising:
directly receiving stacks of planar workpieces on a conveyor from a stacker, and
transferring said stacks on the conveyor to a feeder section of a cutter, wherein—after transferring a stack from said conveyor to said feeder section, rewinding the conveyor to place a foremost free location after existing stacks on the conveyor to a position where it is ready to receive a stack from said stacker.

8. A method according to claim 7, comprising:
maintaining a first variable value and a second variable value indicating a number of free locations on said conveyor ahead of and behind existing stacks on the conveyor respectively,
after receiving a new stack on said conveyor, if said first variable value indicates there to be at least one free location on said conveyor line ahead of existing stacks on the conveyor, advancing the conveyor by one location,
after transferring a stack so said feeder section, if stacks exist on said conveyor and said second variable value indicates there to be no free locations on said conveyor line behind existing stacks on the conveyor, advancing the conveyor by one location,
after advancing the conveyor by one location, decreasing the first variable value and increasing the second variable value, both by an amount corresponding to one location on the conveyor,
after said rewinding, increasing the first variable value by an amount corresponding to one location more than the number of locations re-wound, and setting the second variable value to a value indicating one free location behind existing stacks on the conveyor, and
as a response to said cutter being ready to receive a new stack and stacks existing on said conveyor, advancing the conveyor by as many locations as the current value of the first variable value, increasing the second variable value by an amount indicating the number of locations advanced, and setting the first variable value to indicating no free locations ahead of existing stacks on the conveyor.

9. A method according to claim 7, comprising:
after receiving a new stack on said conveyor, if a free location exists closest to said feeder section, advancing the conveyor by one location,
after transferring a stack to said feeder section, if a stack exists on said conveyor at the location closest to said stacker, advancing the conveyor by one location,
executing said rewinding until only the location closest to said stacker is free, and
as a response to said cutter being ready to receive a new stack and stacks existing on said conveyor, advancing the conveyor until a stack appears at the location closest to said feeder section.

* * * * *